(12) United States Patent
Egashira

(10) Patent No.: US 11,448,315 B2
(45) Date of Patent: Sep. 20, 2022

(54) CONTROL DEVICE

(71) Applicant: Honda Motor Co., Ltd., Tokyo (JP)

(72) Inventor: Fumio Egashira, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/522,882

(22) Filed: Nov. 9, 2021

(65) Prior Publication Data

US 2022/0163108 A1 May 26, 2022

(30) Foreign Application Priority Data

Nov. 20, 2020 (JP) .............................. JP2020-193182

(51) Int. Cl.
*F16H 61/00* (2006.01)
*F16H 61/14* (2006.01)

(52) U.S. Cl.
CPC ....... *F16H 61/143* (2013.01); *F16H 61/0031* (2013.01); *F16H 2061/145* (2013.01)

(58) Field of Classification Search
CPC .............. F16H 61/143; F16H 61/0031; F16H 2061/145; Y02T 10/60; Y02T 10/62
See application file for complete search history.

(56) References Cited

U.S. PATENT DOCUMENTS

| 7,854,683 B2 * | 12/2010 | DeGeorge | F16H 61/143 |
| | | | 477/169 |
| 9,920,796 B2 * | 3/2018 | Tohta | F16H 61/14 |
| 2004/0038774 A1 * | 2/2004 | Kuroda | B60W 30/18027 |
| | | | 477/3 |
| 2014/0097057 A1 * | 4/2014 | Fujikane | F16D 31/08 |
| | | | 192/3.29 |

FOREIGN PATENT DOCUMENTS

JP 2011179584 9/2011

* cited by examiner

*Primary Examiner* — David J Hlavka
(74) *Attorney, Agent, or Firm* — JCIPRNET

(57) ABSTRACT

A control device controls a lockup clutch interposed between an engine and an automatic transmission mechanism of a vehicle. The control device includes a control part supplying hydraulic pressure to the lockup clutch and controlling differential pressure of the lockup clutch. The control part supplies the hydraulic pressure to the lockup clutch so that the differential pressure is lower than a reference differential pressure in a disengaged state of the lockup clutch. In a case of shifting the lockup clutch from the disengaged state to an engaged state, the control part supplies the hydraulic pressure to the lockup clutch so that the differential pressure increases as a filling ratio of an oil passage of the lockup clutch decreases. The reference differential pressure is a lower limit of the differential pressure that increases a slip ratio of the lockup clutch or reduces a slip amount of the lockup clutch.

11 Claims, 6 Drawing Sheets

CONTROL DEVICE

CROSS-REFERENCE TO RELATED APPLICATIONS

This application claims the priority benefit of Japan Application No. 2020-193182, filed on Nov. 20, 2020. The entirety of the above-mentioned patent application is hereby incorporated by reference herein and made a part of this specification.

BACKGROUND

Technical Field

The disclosure relates to a control device.

Related Art

A control device is used which controls a lockup clutch interposed between a drive source and an automatic transmission mechanism of a vehicle. For example, Patent Document 1 discloses a control device that supplies hydraulic pressure as preparation pressure to a lockup clutch upon request for driving torque when the lockup clutch is in a disengaged state in during inertial travel of a vehicle.

PATENT DOCUMENTS

Patent Document 1: Japanese Laid-open No. 2011-179584

In the control device as described above, the lockup clutch is desired to be promptly engaged in response to a command Therefore, when the lockup clutch is shifted from the disengaged state to an engaged state, control may be performed in which higher hydraulic pressure than necessary is temporarily supplied to the lockup clutch for the lockup clutch to maintain the engaged state. Accordingly, it is possible to improve response characteristics of the lockup clutch and shorten the time required for engagement. On the other hand, in the present technical field, it is desired to further reduce the time required for engagement by executing relatively precise control according to the state of the lockup clutch.

SUMMARY

A control device according to an aspect of the disclosure is a control device controlling a lockup clutch interposed between a drive source and an automatic transmission mechanism of a vehicle. The control device includes a control part supplying hydraulic pressure to the lockup clutch and controlling differential pressure of the lockup clutch. The control part supplies the hydraulic pressure to the lockup clutch so that the differential pressure is lower than a reference differential pressure in a disengaged state of the lockup clutch. In a case of shifting the lockup clutch from the disengaged state to an engaged state, the control part supplies the hydraulic pressure to the lockup clutch so that the differential pressure increases as a filling ratio of an oil passage of the lockup clutch decreases. The reference differential pressure is a lower limit of the differential pressure that increases a slip ratio of the lockup clutch, or a lower limit of the differential pressure that reduces a slip amount of the lockup clutch.

DESCRIPTION OF THE EMBODIMENTS

Figure 1:
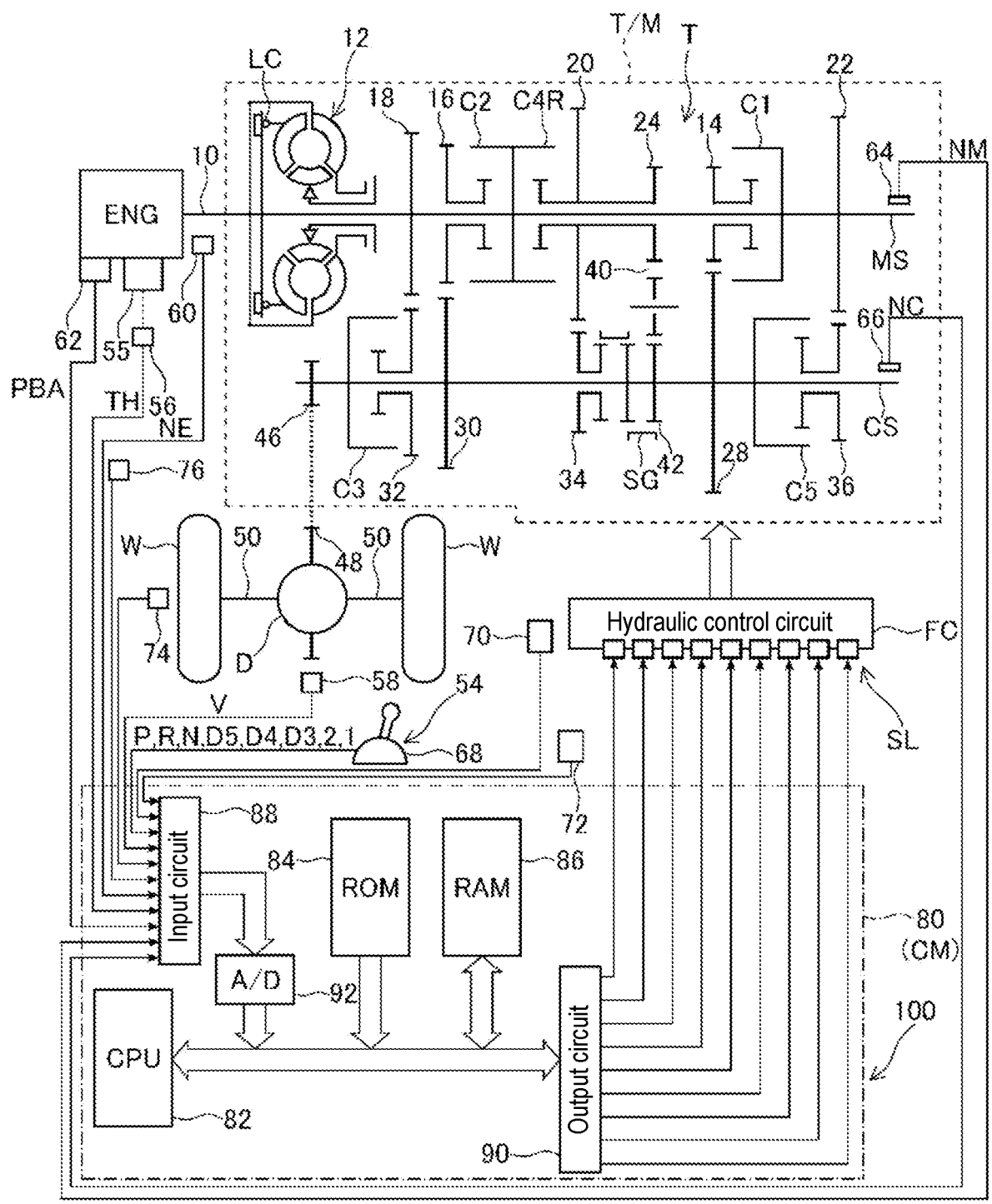
FIG. 1 illustrates an overall configuration of a control device according to the present embodiment and an automatic transmission including a lockup clutch controlled by the control device.

A control device according to the disclosure shortens the time required for engagement according to a state of a lockup clutch.

A control device (100) according to an aspect of the disclosure is a control device (100) controlling a lockup clutch (LC) interposed between a drive source (ENG) and an automatic transmission mechanism (T) of a vehicle. The control device (100) includes a control part (CM) supplying hydraulic pressure to the lockup clutch (LC) and controlling differential pressure of the lockup clutch (LC). The control part (CM) supplies the hydraulic pressure to the lockup clutch (LC) so that the differential pressure is lower than a reference differential pressure in a disengaged state of the lockup clutch (LC). In a case of shifting the lockup clutch (LC) from the disengaged state to an engaged state, the control part (CM) supplies the hydraulic pressure to the lockup clutch (LC) so that the differential pressure increases as a filling ratio of an oil passage (FC9) of the lockup clutch (LC) decreases. The reference differential pressure is a lower limit of the differential pressure that increases a slip ratio of the lockup clutch (LC), or a lower limit of the differential pressure that reduces a slip amount of the lockup clutch (LC).

According to the control device (100), the differential pressure for operating the lockup clutch (LC) can be increased in a range in which the slip ratio of the lockup clutch (LC) is not increased, or in a range in which the slip amount of the lockup clutch (LC) is not reduced (that is, a range in which an engagement ratio of the lockup clutch (LC) is not increased). Moreover, according to the control device (100), even if the filling ratio of the oil passage (FC9) of the lockup clutch (LC) is low, by relatively increasing the differential pressure, a time lag until engagement of the lockup clutch (LC) can be reduced. Thus, the control device (100) is able to shorten the time required for engagement according to a state of the lockup clutch (LC).

In the control device (100) according to an aspect of the disclosure, when the lockup clutch (LC) is in the disengaged state while the vehicle is traveling at a speed equal to or higher than a reference speed while accelerating, the control part (CM) may supply the hydraulic pressure to the lockup clutch (LC) so that the differential pressure is lower than the reference differential pressure. When the lockup clutch (LC) is shifted from the disengaged state to the engaged state while the vehicle is traveling at the speed equal to or higher than the reference speed while accelerating, the control part (CM) may supply the hydraulic pressure to the lockup clutch (LC) so that the differential pressure increases as the filling ratio decreases. According to this, in the case where the vehicle is traveling at the speed equal to or higher than the reference speed while accelerating, the differential pressure for operating the lockup clutch (LC) increases. In such a case, since driving is performed by the drive source (ENG), even if the slip ratio of the lockup clutch (LC) is excessively increased or the slip amount of the lockup clutch (LC) is excessively reduced due to, for example, disturbance, an occupant is not easily aware of vibration or the like of the vehicle caused by an increase in the engagement ratio of the lockup clutch (LC).

In the control device (100) according to an aspect of the disclosure, when the lockup clutch (LC) is in the disengaged state while the vehicle is traveling at the speed equal to or higher than the reference speed while decelerating at a deceleration within a predetermined range, the control part (CM) may supply the hydraulic pressure to the lockup clutch (LC) so that the differential pressure is lower than the reference differential pressure. When the lockup clutch (LC) is shifted from the disengaged state to the engaged state while the vehicle is traveling at the speed equal to or higher than the reference speed while decelerating at the deceleration within the predetermined range, the control part (CM) may supply the hydraulic pressure to the lockup clutch (LC) so that the differential pressure increases as the filling ratio decreases. According to this, in the case where the vehicle is traveling at the speed equal to or higher than the reference speed while decelerating at the deceleration within the predetermined range, the differential pressure for operating the lockup clutch (LC) increases. In such a case, since the vehicle is in the deceleration state, even if the slip ratio of the lockup clutch (LC) is excessively increased or the slip amount of the lockup clutch (LC) is excessively reduced due to, for example, disturbance, the occupant is not easily aware of vibration or the like of the vehicle caused by an increase in the engagement ratio of the lockup clutch (LC).

In the control device (100) according to an aspect of the disclosure, in a case of preventing the lockup clutch (LC) in the disengaged state from being shifted from the disengaged state to the engaged state, the control part (CM) may open the oil passage (FC9) when the slip ratio is equal to or higher than a first reference slip ratio, and may stop opening of the oil passage (FC9) when the slip ratio is equal to or lower than a second reference slip ratio that is lower than the first reference slip ratio. According to this, even if the slip ratio of the lockup clutch (LC) is excessively increased due to, for example, disturbance, since the differential pressure can be reduced by opening the oil passage (FC9), an increase in the engagement ratio of the lockup clutch (LC) can be suppressed. In addition, when the slip ratio of the lockup clutch (LC) decreases as a result of opening the oil passage (FC9), an excessive decrease in the slip ratio can be suppressed by stopping opening of the oil passage (FC9). At this time, since a threshold value (second reference slip ratio) of the slip ratio for stopping opening of the oil passage (FC9) is lower than a threshold value (first reference slip ratio) of the slip ratio for opening the oil passage (FC9) (that is, since the opening characteristics of the oil passage (FC9) have hysteresis), the opening and the stopping of opening of the oil passage (FC9) can be prevented from being frequently repeated.

In the control device (100) according to an aspect of the disclosure, in a case of preventing the lockup clutch (LC) in the disengaged state from being shifted from the disengaged state to the engaged state, the control part (CM) may open the oil passage (FC9) when the slip amount is equal to or less than a first reference slip amount, and may stop opening of the oil passage (FC9) when the slip amount is equal to or greater than a second reference slip amount that is greater than the first reference slip amount. According to this, even if the slip amount of the lockup clutch (LC) is excessively reduced due to, for example, disturbance, since the differential pressure can be reduced by opening the oil passage (FC9), an increase in the engagement ratio of the lockup clutch (LC) can be suppressed. In addition, when the slip amount of the lockup clutch (LC) increases as a result of opening the oil passage (FC9), an excessive increase in the slip amount can be suppressed by stopping opening of the oil passage (FC9). At this time, since a threshold value (second reference slip amount) of the slip amount for stopping opening of the oil passage (FC9) is higher than a threshold value (first reference slip amount) of the slip amount for opening the oil passage (FC9) (that is, since the opening characteristics of the oil passage (FC9) have hysteresis), the opening and the stopping of opening of the oil passage (FC9) can be prevented from being frequently repeated.

In the control device (100) according to an aspect of the disclosure, the control part (CM) may calculate the slip ratio or the slip amount based on an input rotation speed and an output rotation speed of the lockup clutch (LC), and may calculate the filling ratio based on the input rotation speed and an oil temperature. For example, the control part (CM) may calculate the slip ratio based on a ratio of the input rotation speed to the output rotation speed of the lockup clutch (LC). Alternatively, the control part (CM) may calculate the slip amount based on a difference between the input rotation speed and the output rotation speed of the lockup clutch (LC). According to this, the above-mentioned actions and effects of the control device (100) can be suitably exhibited.

In the control device (100) according to an aspect of the disclosure, the control part (CM) may calculate the slip ratio or the slip amount based on the input rotation speed, the output rotation speed, and a heat generation amount of the lockup clutch (LC). In the case where the heat generation amount is greater than a reference heat generation amount, the control part (CM) may maintain the filling ratio so that the filling ratio is equal to or lower than a reference filling ratio. According to this, since the slip ratio or slip amount of the lockup clutch (LC) is calculated using the heat generation amount of the lockup clutch (LC) as well, relatively accurate calculation of the slip ratio or the slip amount is enabled. Since the filling ratio of the oil passage (FC9) can be adjusted according to the heat generation amount of the lockup clutch (LC), it is possible to maintain the differential pressure for operating the lockup clutch (LC) at a relatively suitable pressure.

The reference numerals in parentheses above indicate the reference numerals of components in embodiments described later as an example of the disclosure, and the disclosure is not limited to the embodiments.

In this way, a control device according to the disclosure is able to shorten the time required for engagement according to a state of a lockup clutch.

Exemplary embodiments are described below with reference to the drawings. The same or corresponding parts in each figure are denoted by the same reference numerals, and repeated description is omitted.

[Overall Configuration]

FIG. 1 illustrates an overall configuration of a control device 100 according to the present embodiment and a transmission (automatic transmission) T/M including a lockup clutch LC controlled by the control device 100. As shown in FIG. 1, the control device 100 controls the lockup clutch LC interposed between a drive source such as an engine ENG and an automatic transmission mechanism T of a vehicle. Here, the term "vehicle" may refer to a four-wheeled vehicle such as a passenger car or a truck. The term "engine" may refer to an internal combustion engine that generates a driving force by gasoline, light oil or the like, and may specifically refer to a spark-ignition engine having multiple cylinders and using gasoline as fuel. The term "drive source" is not limited to the engine ENG, and may refer to a motor or the like that electrically generates a driving force.

The transmission T/M includes a torque converter 12 and the automatic transmission mechanism T. The torque converter 12 is a mechanism that transmits a rotational driving force generated by the engine ENG using a fluid so that the rotational driving force can be turned on or off. The automatic transmission mechanism T is a mechanism to which the rotational driving force transmitted from the engine ENG via the torque converter 12 is input and a rotation speed thereof is changed. Here, examples of the transmission T/M include a parallel shaft type stepped transmission having speed stages including five forward speeds and one reverse speed. The transmission T/M includes: a mainshaft (input shaft) MS, connected via the torque converter 12 to an output shaft 10 connected to a crankshaft of the engine ENG; and a countershaft (output shaft) CS, connected to the mainshaft MS via multiple gear trains.

The torque converter 12 includes the lockup clutch LC for direct connection to the torque converter 12. The torque converter 12 connects/disconnects the output shaft 10 and the mainshaft MS according to hydraulic pressure of supplied hydraulic oil (ATF). Here, "connect/disconnect" includes continuous (or discontinuous) realization of states at each extent (or at some extents) from a completely released state (a state in which the output shaft 10 and the mainshaft MS are rotatable independently of each other) to a completely engaged state (a state in which the output shaft 10 and the mainshaft MS are directly connected). The "extent" of connection/disconnection may be expressed as a slip ratio being a ratio of a rotation speed (output rotation speed of the lockup clutch LC) of the mainshaft MS to a rotation speed (input rotation speed of the lockup clutch LC) of the output shaft 10, or may be expressed as a slip amount being a difference between the rotation speed of the output shaft 10 and the rotation speed of the mainshaft MS. The slip ratio and the slip amount may be collectively referred to as an engagement degree index value of the lockup clutch LC. The slip ratio takes a greater value in the completely engaged state than in the completely released state. On the other hand, the slip amount takes a smaller value in the completely engaged state than in the completely released state. The slip ratio may not be a simple ratio between the input rotation speed and the output rotation speed, and the slip amount may not be a simple difference between the input rotation speed and the output rotation speed.

Supported on the mainshaft MS are a main first gear 14, a main second gear 16, a main third gear 18, a main fourth gear 20, a main fifth gear 22, and a main reverse gear 24. Supported on the countershaft CS are a counter first gear 28 meshing with the main first gear 14, a counter second gear 30 meshing with the main second gear 16, a counter third gear 32 meshing with the main third gear 18, a counter fourth gear 34 meshing with the main fourth gear 20, a counter fifth gear 36 meshing with the main fifth gear 22, and a counter reverse gear 42 connected to the main reverse gear 24 via a reverse idle gear 40.

Here, when the main first gear 14 relatively rotatably supported by the mainshaft MS is coupled to the mainshaft MS by a first speed hydraulic clutch C1, a first speed as a speed stage is established. The "hydraulic clutch" is an example of a frictional engagement element. When the main second gear 16 relatively rotatably supported by the mainshaft MS is coupled to the mainshaft MS by a second speed hydraulic clutch C2, a second speed as a speed stage is established. When the counter third gear 32 relatively rotatably supported by the countershaft CS is coupled to the countershaft CS by a third speed hydraulic clutch C3, a third speed as a speed stage is established.

In a state in which the counter fourth gear 34 relatively rotatably supported by the countershaft CS is coupled to the countershaft CS by a selector gear SG, when the main fourth gear 20 relatively rotatably supported by the mainshaft MS is coupled to the mainshaft MS by a fourth-speed reverse hydraulic clutch C4R, a fourth speed as a speed stage is established. When the counter fifth gear 36 relatively rotatably supported by the countershaft CS is coupled to the countershaft CS by a fifth speed hydraulic clutch C5, a fifth speed as a speed stage is established. In a state in which the counter reverse gear 42 relatively rotatably supported by the countershaft CS is coupled to the countershaft CS by the selector gear SG, when the main reverse gear 24 relatively rotatably supported by the mainshaft MS is coupled to the mainshaft MS by the fourth-speed reverse hydraulic clutch C4R, a reverse speed stage is established.

Rotation of the countershaft CS is transmitted to a differential D via a final drive gear 46 and a final driven gear 48. The rotation transmitted to the differential D is transmitted to driving wheels W and W of the vehicle via drive shafts 50 and 50 respectively on the left and right sides. A shift lever 54 is provided in the vicinity of the floor at a driver's seat of the vehicle. The shift lever 54 selects any of eight ranges (positions), i.e., P, R, N, D5, D4, D3, 2, and 1, by the driver's operation.

A throttle valve disposed in an intake passage of the engine ENG is connected to a drive by wire (DBW) mechanism 55. That is, the throttle valve is not mechanically connected to an accelerator pedal and is driven by an actuator such as a motor. A throttle opening degree sensor 56 is provided in the vicinity of the actuator of the DBW mechanism 55. The throttle opening degree sensor 56 outputs a signal indicating a throttle opening degree TH based on the amount of rotation of the actuator.

A speed sensor 58 is provided in the vicinity of the final driven gear 48. The speed sensor 58 outputs a signal indicating a vehicle speed V for each rotation of the final driven gear 48. A crank angle sensor 60 is provided in the vicinity of a camshaft. The crank angle sensor 60 outputs a CYL signal at a predetermined crank angle of a specific cylinder, outputs a TDC signal at a predetermined crank angle of each cylinder, and outputs a CRK signal at each crank angle obtained by subdividing (for example, 15 degrees) a predetermined crank angle. The signal output by the speed sensor 58 and the CRK signal output by the crank angle sensor 60 are measured by a counter for the time interval, and the vehicle speed V and an engine speed NE are detected.

An absolute pressure sensor 62 is provided downstream of a position where the throttle valve is disposed in the intake passage of the engine ENG. The absolute pressure sensor 62 outputs a signal indicating an intake pipe absolute pressure (engine load) PBA.

A first rotation speed sensor 64 is provided in the vicinity of the mainshaft MS. The first rotation speed sensor 64 outputs a signal indicating a rotation speed (input shaft rotation speed of the transmission T/M) NM of the mainshaft MS. A second rotation speed sensor 66 is provided in the vicinity of the countershaft CS. The second rotation speed sensor 66 outputs a signal indicating a rotation speed (output shaft rotation speed of the transmission T/M) NC of the countershaft CS. The signals output by the first rotation speed sensor 64 and the second rotation speed sensor 66 are measured by a counter for the time interval, and the rotation speed NM of the mainshaft MS and the rotation speed NC of the countershaft CS are detected.

A shift lever position sensor 68 is provided in the vicinity of the shift lever 54 mounted in the vicinity of the driver's seat of the vehicle. The shift lever position sensor 68 outputs a signal indicating the range selected by the driver among the above-mentioned eight ranges P, R, N, D5, D4, D3, 2, and 1.

A temperature sensor 70 is provided in the vicinity of a reservoir FC2 (see FIG. 2) of a hydraulic circuit (hydraulic control circuit) FC of the transmission T/M. The temperature sensor 70 outputs a signal indicating a value corresponding to (for example, proportional to) an oil temperature (temperature of hydraulic oil). An oil passage connected to each hydraulic clutch is provided with a hydraulic pressure switch 72, and the temperature sensor 70 outputs an ON signal when the hydraulic pressure supplied to each hydraulic clutch reaches a predetermined value.

A brake switch 74 is provided in the vicinity of a brake pedal at the driver's seat of the vehicle. The brake switch 74 outputs an ON signal in response to the driver's operation of the brake pedal. An accelerator opening degree sensor 76 is provided in the vicinity of the accelerator pedal. The accelerator opening degree sensor 76 outputs a signal corresponding to an accelerator opening degree (depression amount of the accelerator pedal) of the driver.

The signals output by each sensor or the like described above are transmitted to an electronic control unit (ECU) 80. The ECU 80 is composed of, for example, a microcomputer including a CPU 82, a ROM 84, a RAM 86, an input circuit 88, and an output circuit 90. The microcomputer includes an A/D converter 92. The signals output by each sensor or the like are input to the ECU 80 via the input circuit 88, in which analog output is converted into a digital value via the A/D converter 92 while digital output is processed through a processing circuit such as a waveform shaping circuit, and are stored in the RAM 86. The information stored in the RAM 86 is output to each linear solenoid SL or the like of the hydraulic circuit FC via the output circuit 90. Accordingly, the operation of the hydraulic circuit FC is controlled. In this way, the ECU 80 provided in the control device 100 functions as a control part (control means) CM for controlling the operation of the hydraulic clutch FC (more specifically, for supplying hydraulic pressure to the lockup clutch LC and controlling differential pressure of the lockup clutch LC).

Figure 2:
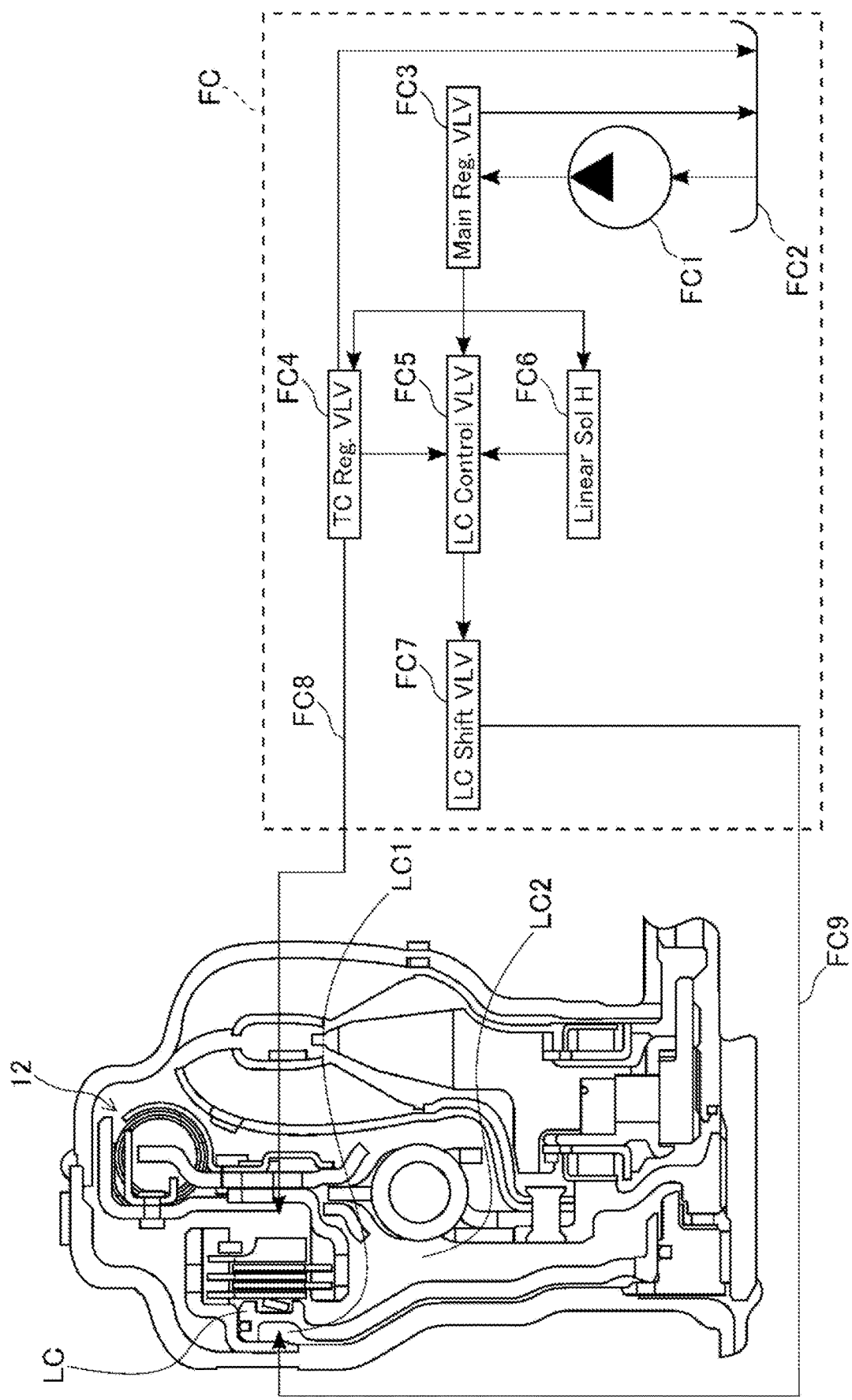
FIG. 2 partially illustrates a hydraulic circuit of an automatic transmission.

FIG. 2 partially illustrates the hydraulic circuit FC of the transmission T/M. As shown in FIG. 2, a hydraulic pump FC1 is provided in the hydraulic circuit FC. The hydraulic pump FC1 is driven by the engine ENG and supplies the hydraulic oil stored in the reservoir FC2 to a main regulator valve FC3. The main regulator valve FC3 adjusts a discharge pressure of the hydraulic pump FC1 according to a traveling state of the vehicle, and generates a PH pressure (source pressure, line pressure). The main regulator valve FC3 supplies the generated PH pressure to a torque converter regulator valve FC4, a lockup clutch control valve FC5, and a linear solenoid valve FC6.

The torque converter regulator valve FC4 generates inner pressure of the torque converter 12. That is, the torque converter regulator valve FC4 supplies the hydraulic pressure of the hydraulic oil to an oil passage FC8 of the torque converter 12, and adjusts piston pressure of the lockup clutch LC. The torque converter regulator valve FC4 refluxes a part of the hydraulic oil to the reservoir FC2.

The linear solenoid valve FC6 generates control pressure of the lockup clutch LC and supplies the same to the lockup clutch control valve FC5. The lockup clutch control valve FC5 generates the piston pressure of the lockup clutch LC. That is, the lockup clutch control valve FC5 supplies the hydraulic pressure of the hydraulic oil to an oil passage FC9 of the lockup clutch LC via a lockup clutch shift valve FC7, and adjusts the piston pressure of the lockup clutch LC.

The lockup clutch LC includes a back pressure chamber LC1 and an inner pressure chamber LC2. The inner pressure chamber LC2 is supplied with hydraulic pressure (torque converter inner pressure) from the oil passage FC8 connected thereto. The back pressure chamber LC1 is supplied with hydraulic pressure (lockup clutch piston pressure) from the oil passage FC9 connected thereto. Accordingly, differential pressure between the back pressure chamber LC1 and the inner pressure chamber LC2 of the lockup clutch LC is controlled, and the lockup clutch LC is connected/disconnected. For example, when the lockup clutch LC is released, the back pressure chamber LC1 is supplied with the hydraulic pressure from the oil passage FC9, while the inner pressure chamber LC2 discharges the hydraulic pressure via the oil passage FC8. By operation of the lockup clutch shift valve FC7, the opening and the stopping of opening (that is, opening and filling) of the oil passage FC9 are executed. The differential pressure may have, for example, a value obtained by subtracting the lockup clutch piston pressure from the torque converter inner pressure. In this case, if the lockup clutch piston pressure is higher than the torque converter inner pressure, it is assumed that a positive differential pressure is generated; if the lockup clutch piston pressure is lower than the torque converter inner pressure, it is assumed that a negative differential pressure is generated.

[Oil Passage Early Filling Control]

Figure 3:
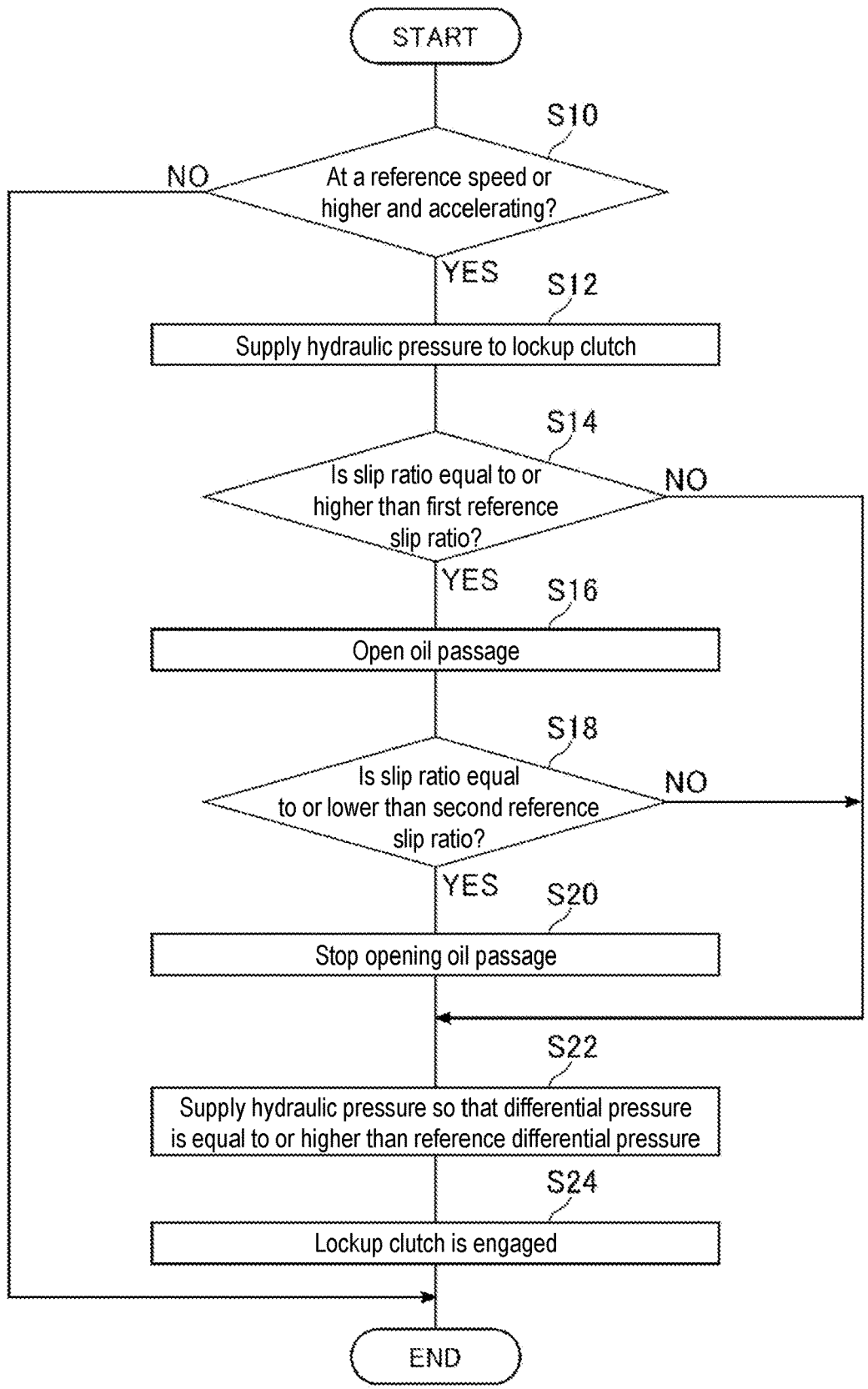
FIG. 3 is a flowchart showing oil passage early filling control of a lockup clutch.
Figure 4:
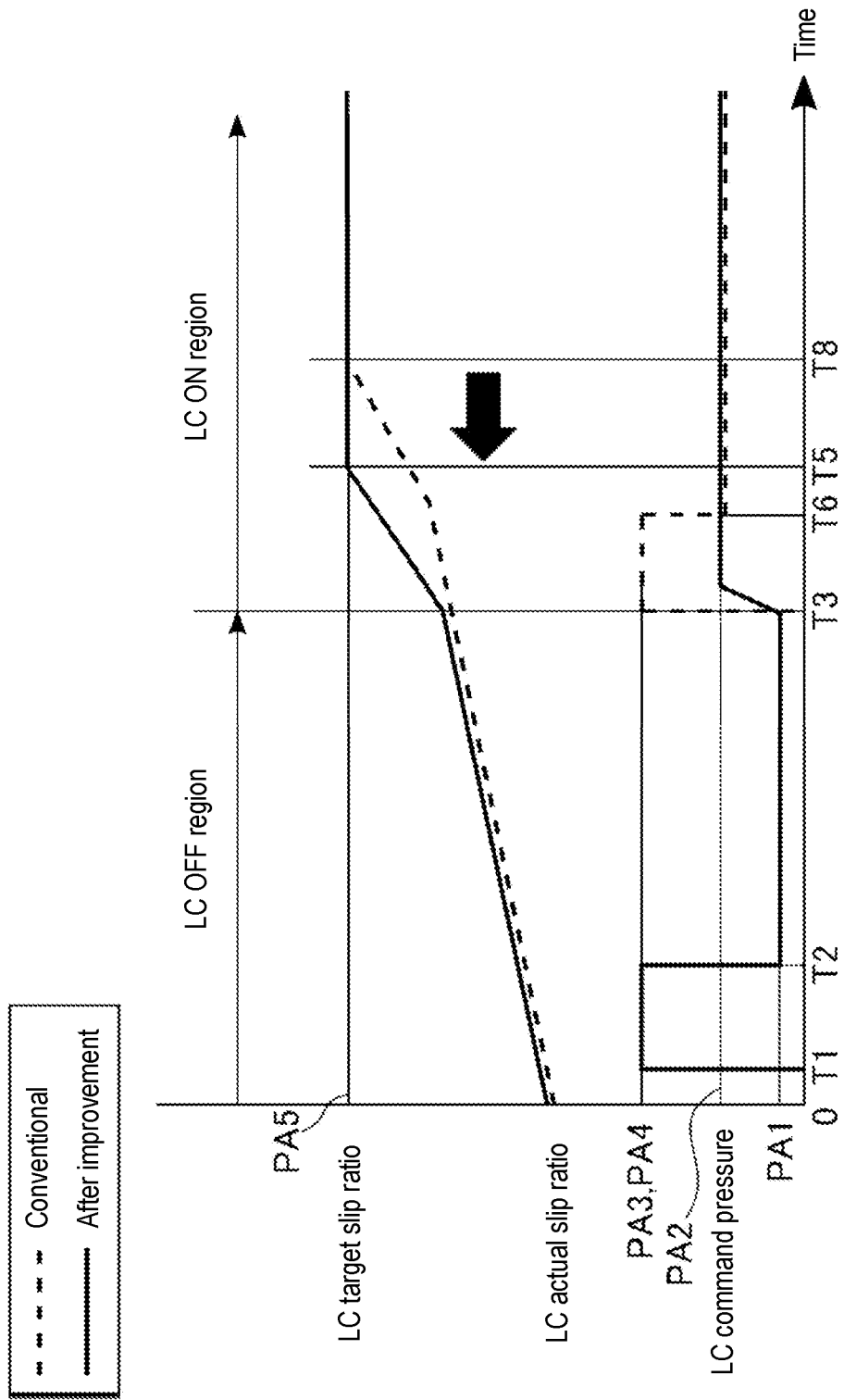
FIG. 4 is a timing chart showing an entire section of oil passage early filling control of a lockup clutch.
Figure 5:
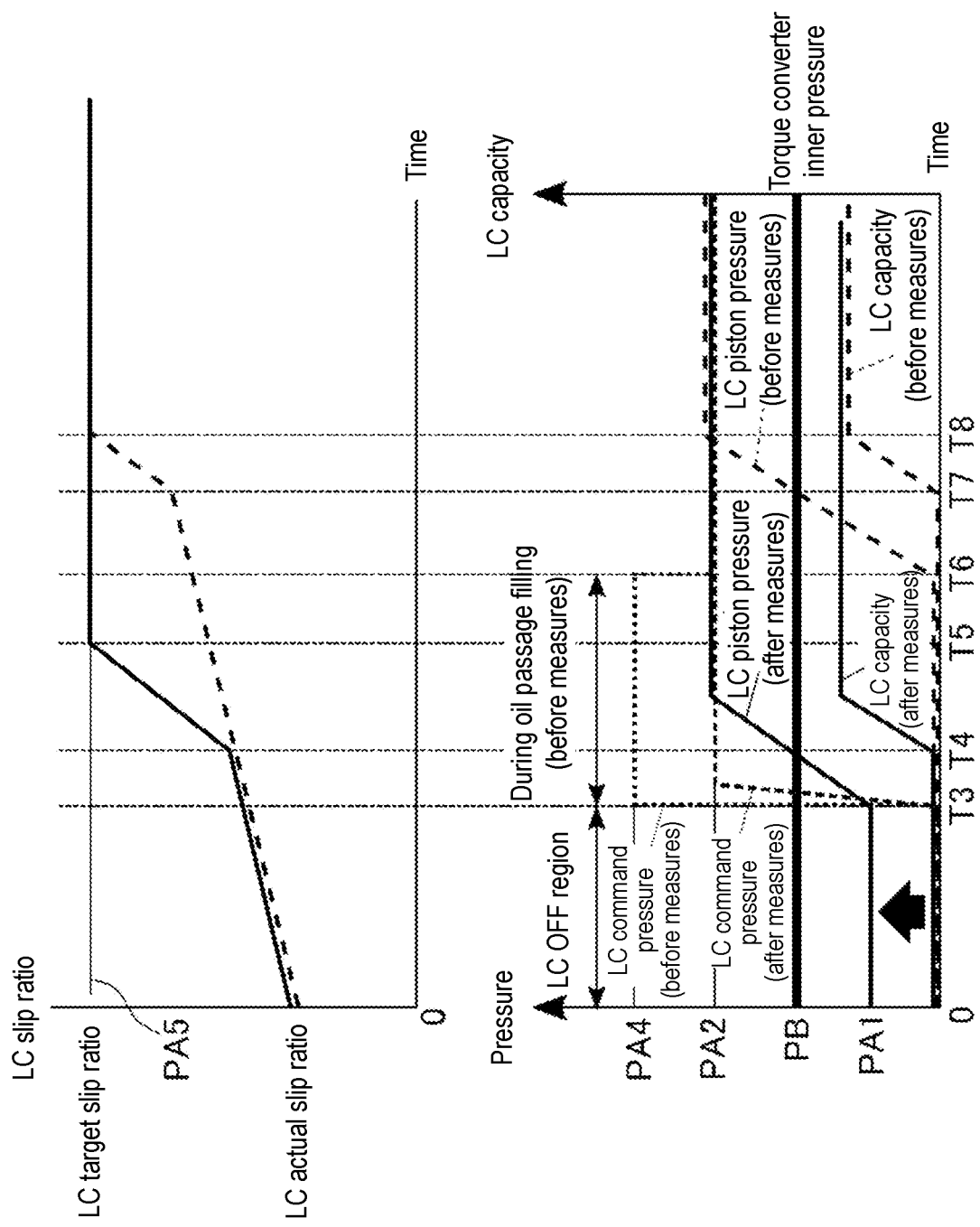
FIG. 5 is a timing chart showing a main section of oil passage early filling control of a lockup clutch.

Subsequently described is oil passage early filling control of the lockup clutch LC executed by the control device 100. FIG. 3 is a flowchart showing the oil passage early filling control of the lockup clutch LC. FIG. 4 is a timing chart showing an entire section of the oil passage early filling control of the lockup clutch LC. FIG. 5 is a timing chart showing a main section of the oil passage early filling control of the lockup clutch LC. In FIG. 4, an example of conventional control in which the oil passage early filling control is not executed is shown by a broken line, and the oil passage early filling control by the control device 100 is shown by a solid line. Similarly, in LC actual slip ratio of FIG. 5, an example of conventional control is shown by a broken line, and the oil passage early filling control is shown by a solid line. In LC command pressure, LC piston pressure and LC capacity of FIG. 5, an example of conventional control is shown as "before measures" and the oil passage early filling control is shown as "after measures". FIG. 4 and FIG. 5 respectively schematically show separate cases of the oil passage early filling control, and details of waveforms of the respective timing charts are not necessarily consistent with each other.

The control device 100 realizes the oil passage early filling control shown in FIG. 3 to FIG. 5 by controlling the differential pressure of the lockup clutch LC by the control part CM. The control device 100 starts the flowchart of FIG.

3 when the lockup clutch LC is in a disengaged state. The term "disengaged state" refers to, for example, a state in which the lockup clutch LC has no torque capacity. In contrast, the term "engaged state" refers to, for example, a state in which the lockup clutch LC has a torque capacity. In the following description, it is assumed that the control device 100 executes control in which the slip ratio is selected as the engagement degree index value of the lockup clutch LC.

In step S10 of FIG. 3, the control device 100 determines whether the vehicle is traveling at a speed equal to or higher than a reference speed while accelerating. The term "reference speed" refers to a preset speed. If it is determined that the vehicle is traveling at the speed equal to or higher than the reference speed while accelerating (step S10: YES), the oil passage early filling control shifts to step S12. On the other hand, if it is not determined that the vehicle is traveling at the speed equal to or higher than the reference speed while accelerating (step S10: NO), the oil passage early filling control is ended without execution of specific processing, and the oil passage early filling control is started anew from step S10.

In step S12, in the control device 100, when the lockup clutch LC is in the disengaged state, hydraulic pressure is supplied by the control part CM to the lockup clutch LC so that the differential pressure is lower than a reference differential pressure. Here, the term "reference differential pressure" refers to a lower limit of the differential pressure that increases the slip ratio of the lockup clutch LC. In other words, the reference differential pressure is a differential pressure that does not contribute to the slip ratio (or slip amount). That is, the reference differential pressure is defined as follows. If a differential pressure is lower than the reference differential pressure, the capacity (LC capacity) of the lockup clutch LC is equal to or less than a predetermined value (having no torque capacity, that is, not transmitting torque). As an example, the reference differential pressure may be 0 (that is, the case where the torque converter inner pressure and the lockup clutch piston pressure are equivalent). The slip ratio of the lockup clutch LC (the slip ratio when the lockup clutch LC is in the completely released state) is calculated based on the rotation speed of the output shaft 10 (input rotation speed of the lockup clutch LC), the rotation speed of the mainshaft MS (output rotation speed of the lockup clutch LC) and a heat generation amount of the lockup clutch LC.

Here, in FIG. 4, after the LC command pressure (lockup clutch command pressure) is set to a command pressure PA3 during a period from time T1 to time T2, the LC command pressure is reset to a command pressure PA1 at time T2. In the state in which the LC command pressure is reset to the command pressure PA1, the differential pressure of the lockup clutch LC is lower than the reference differential pressure. After that, the LC command pressure is maintained at the command pressure PA1 during a period from time T2 to time T3. Therefore, during the period from time T2 to time T3, the control part CM supplies the hydraulic pressure to the lockup clutch LC so that differential pressure lower than the reference differential pressure (which is the lower limit of the differential pressure that increases the slip ratio of the lockup clutch LC) is achieved. In the state in which the LC command pressure is set to the command pressure PA3, the differential pressure of the lockup clutch LC may also be lower than the reference differential pressure. In FIG. 4, while the LC command pressure is maintained at the command pressure PA1 during the period from time T2 to time T3, the LC actual slip ratio increases as input torque to the transmission T/M and the rotation speed of the mainshaft MS change.

In step S14, the control device 100 determines by the control part CM whether the slip ratio is equal to or higher than a preset first reference slip ratio over the period (that is, the period during which the lockup clutch LC is not engaged) from time T2 to time T3. If it is determined that the slip ratio is equal to or higher than the first reference slip ratio (step S14:YES), the oil passage early filling control shifts to step S16. On the other hand, if it is not determined that the slip ratio is equal to or higher than the first reference slip ratio (step S14:NO), the oil passage early filling control shifts to step S22.

In step S16, the control device 100 opens the oil passage FC9 by the control part CM. Specifically, the control part CM operates the lockup clutch shift valve FC7, opens the oil passage FC9, and reduces the lockup clutch piston pressure, thereby reducing the differential pressure of the lockup clutch LC. After that, the oil passage early filling control shifts to step S18.

In step S18, the control device 100 determines by the control part CM whether the slip ratio is equal to or lower than a preset second reference slip ratio over the period (that is, the period during which the lockup clutch LC is not engaged) from time T2 to time T3. The second reference slip ratio is a slip ratio lower than the first reference slip ratio. If it is determined that the slip ratio is equal to or lower than the second reference slip ratio (step S18:YES), the oil passage early filling control shifts to step S20. On the other hand, if it is not determined that the slip ratio is equal to or lower than the second reference slip ratio (step S18:NO), the oil passage early filling control shifts to step S22.

In step S20, the control device 100 stops opening of the oil passage FC9 by the control part CM. Specifically, the control part CM operates the lockup clutch shift valve FC7, stops opening of the oil passage FC9, and suppresses reduction in the lockup clutch piston pressure, thereby suppressing reduction in the differential pressure of the lockup clutch LC. To put the above step S14 to step S20 in another way, in a case of preventing the lockup clutch LC in the disengaged state from being shifted from the disengaged state to the engaged state, the control part CM opens the oil passage FC9 when the slip ratio is equal to or higher than the first reference slip ratio. Then, when the slip ratio is equal to or lower than the second reference slip ratio that is lower than the first reference slip ratio, the control part CM stops opening of the oil passage FC9. After that, the oil passage early filling control shifts to step S22.

In step S22, in the case of shifting the lockup clutch LC from the disengaged state to the engaged state, the control device 100 supplies the hydraulic pressure to the lockup clutch LC by the control part CM so that the differential pressure is equal to or higher than the reference differential pressure. Here, the control device 100 calculates a filling ratio (LC oil passage filling ratio) by the control part CM based on the input rotation speed of the lockup clutch LC and the oil temperature. Specifically, by adding a filling ratio change amount to the filling ratio acquired last time using a filling ratio change amount map corresponding to the input rotation speed of the lockup clutch LC and the oil temperature, the control part CM acquires the present filling ratio. In the case where the heat generation amount of the lockup clutch LC is greater than a reference heat generation amount, the control part CM maintains the filling ratio so that the filling ratio is equal to or lower than a reference filling ratio.

In step S24, as a result of the fact that the hydraulic pressure is supplied to the lockup clutch LC so that the differential pressure is equal to or higher than the reference differential pressure, the lockup clutch LC is activated and the lockup clutch LC is shifted from the disengaged state to the engaged state. Accordingly, the oil passage early filling control is ended.

Here, in FIG. 4, at time T3, the LC command pressure is increased from the command pressure PA1 (that is, LC command pressure that causes a differential pressure lower than the reference differential pressure) to a command pressure PA2 (that is, LC command pressure that causes a differential pressure equal to or higher than the reference differential pressure). The command pressure PA2 may be set so that the lower the filling ratio of the oil passage FC9 of the lockup clutch LC, the higher the differential pressure (details thereof will be described later). As a result, the LC actual slip ratio increases, and reaches an LC target slip ratio at time T5. Accordingly, it is possible to cause the LC actual slip ratio to reach the LC target slip ratio at an earlier time than time t8 at which the LC actual slip ratio reaches the LC target slip ratio in the conventional control in which the oil passage early filling control by the control device 100 is not executed.

On the other hand, in the example of conventional control shown by the broken line in FIG. 4, the LC command pressure is regarded as 0 until a timing (time T3) at which the LC actual slip ratio starts to increase toward the LC target slip ratio. Then, during a period from time T3 to time T6, by setting the LC command pressure to a command pressure PA4 higher than the command pressure PA2 (here, the command pressure PA4 is equal to the command pressure PA3), the increase of the LC actual slip ratio is accelerated. After that, the LC command pressure is reset to the command pressure PA2. However, in such an example of conventional control, compared with the oil passage early filling control by the control device 100, a long time is taken for the LC actual slip ratio to reach the LC target slip ratio.

In the oil passage early filling control shown by the solid line in FIG. 5, the LC command pressure is regarded as the command pressure PA1 until time T3, the LC capacity is generated (or becomes equal to or greater than the predetermined value) after time T4 at which the piston pressure (LC piston pressure) of the lockup clutch LC exceeds a constant inner pressure (torque converter inner pressure) of the torque converter 12, and the LC actual slip ratio increases. In this way, by applying the LC piston pressure in advance, the time until the LC piston pressure exceeds the torque converter inner pressure is shortened.

On the other hand, in the example of conventional control shown by the broken line in FIG. 5, the LC command pressure is regarded as 0 until time T3, and the LC command pressure is set to the command pressure PA4 higher than the command pressure PA2 during the period from time T3 to time T6. However, time T7 at which the LC capacity is generated is later than time T4 at which the LC capacity is generated in the oil passage early filling control. As a result, the timing at which the LC actual slip ratio starts to increase is also later than that in the case of the oil passage early filling control.

Figure 6:
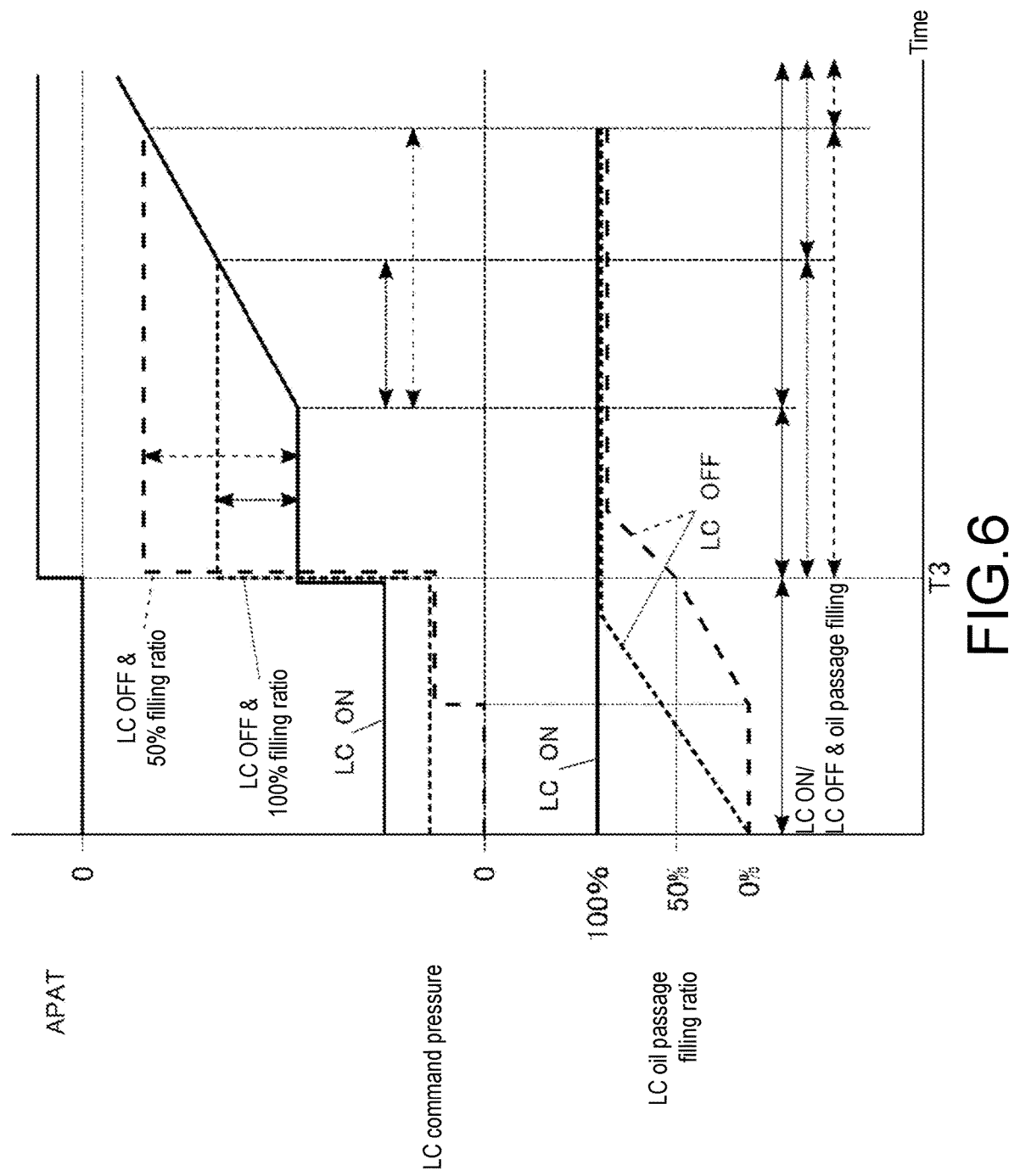
FIG. 6 is a timing chart for describing an LC command pressure corresponding to a filling ratio in oil passage early filling control of a lockup clutch.

Subsequently described is the above step S24 in which the command pressure PA2 is set so that the lower the filling ratio of the oil passage FC9 of the lockup clutch LC, the higher the differential pressure. FIG. 6 is a timing chart for describing an LC command pressure corresponding to a filling ratio in the oil passage early filling control of the lockup clutch LC. As shown in FIG. 6, in the disengaged state (LC OFF) of the lockup clutch LC, in comparison between when the filling ratio of the oil passage FC9 is 50% and when it is 100%, the LC command pressure of the lockup clutch LC is set to be higher when the filling ratio is 50% than when it is 100%. Accordingly, it is possible to set a relatively high LC command pressure in a situation where filling of the oil passage FC9 should be urgently performed. In FIG. 6, at time T3, an accelerator opening degree APAT increases from 0 to a positive number (accelerator: ON), and the LC command pressure increases at that timing. FIG. 6 also shows the command pressure and the filling ratio in the case where the lockup clutch LC is in the engaged state (LC ON). Compared with this case, the LC command pressure is set higher in each case of LC OFF after time T3.

In the oil passage early filling control described above, the control device 100 executes control in which the slip ratio is selected as the engagement degree index value of the lockup clutch LC. However, in the control device 100, the slip ratio may not be selected as the engagement degree index value of the lockup clutch LC, and the slip amount, for example, may be selected as the engagement degree index value of the lockup clutch LC. In this case, in the oil passage early filling control shown in FIG. 3 to FIG. 6, the slip ratio can be replaced with the slip amount. For example, in step S14 to step S20 of the flowchart shown in FIG. 3, in the case of preventing the lockup clutch LC in the disengaged state from being shifted from the disengaged state to the engaged state, the control part CM may open the oil passage FC9 when the slip amount is equal to or less than a first reference slip amount. Then, when the slip amount is equal to or greater than a second reference slip amount that is greater than the first reference slip amount, the control part CM may stop opening of the oil passage FC9. The reference differential pressure in this case is regarded as the lower limit of the differential pressure that reduces the slip amount of the lockup clutch LC.

[Actions and Effects]

As described above, the control device 100 is a control device controlling the lockup clutch LC interposed between the engine ENG and the automatic transmission mechanism T of the vehicle. The control device 100 includes the control part CM supplying hydraulic pressure to the lockup clutch LC and controlling differential pressure of the lockup clutch LC. The control part CM supplies the hydraulic pressure to the lockup clutch LC so that the differential pressure is lower than a reference differential pressure in the disengaged state of the lockup clutch LC. In the case of shifting the lockup clutch LC from the disengaged state to the engaged state, the control part CM supplies the hydraulic pressure to the lockup clutch LC so that the differential pressure increases as the filling ratio of the oil passage FC9 of the lockup clutch LC decreases. The reference differential pressure is the lower limit of the differential pressure that increases the slip ratio of the lockup clutch LC, or the lower limit of the differential pressure that reduces the slip amount of the lockup clutch LC.

According to the control device 100, the differential pressure for operating the lockup clutch LC can be increased in a range in which the slip ratio of the lockup clutch LC is not increased, or in a range in which the slip amount of the lockup clutch LC is not reduced (that is, a range in which an engagement ratio of the lockup clutch LC is not increased). Moreover, according to the control device 100, even if the filling ratio of the oil passage FC9 of the lockup clutch LC is low, by relatively increasing the differential pressure, a time lag until engagement of the lockup clutch LC can be reduced. Thus, the control device 100 is able to shorten the time required for engagement according to a state of the lockup clutch LC.

In the control device 100, when the lockup clutch LC is in the disengaged state while the vehicle is traveling at a speed equal to or higher than the reference speed while accelerating, the control part CM supplies the hydraulic pressure to the lockup clutch LC so that the differential pressure is lower than the reference differential pressure. When the lockup clutch LC is shifted from the disengaged state to the engaged state while the vehicle is traveling at the speed equal to or higher than the reference speed while accelerating, the control part CM supplies the hydraulic pressure to the lockup clutch LC so that the differential pressure increases as the filling ratio decreases. Accordingly, in the case where the vehicle is traveling at the speed equal to or higher than the reference speed while accelerating, the differential pressure for operating the lockup clutch LC increases. In such a case, since driving is performed by the engine ENG, even if the slip ratio of the lockup clutch LC is excessively increased or the slip amount of the lockup clutch LC is excessively reduced due to, for example, disturbance, an occupant is not easily aware of vibration or the like of the vehicle caused by an increase in the engagement ratio of the lockup clutch LC.

In the control device 100, in the case of preventing the lockup clutch LC in the disengaged state from being shifted from the disengaged state to the engaged state, the control part CM opens the oil passage FC9 when the slip ratio is equal to or higher than the first reference slip ratio, and stops opening of the oil passage FC9 when the slip ratio is equal to or lower than the second reference slip ratio that is lower than the first reference slip ratio. Accordingly, even if the slip ratio of the lockup clutch LC is excessively increased due to, for example, disturbance, since the differential pressure can be reduced by opening the oil passage FC9, an increase in the engagement ratio of the lockup clutch LC can be suppressed. In addition, when the slip ratio of the lockup clutch LC decreases as a result of opening the oil passage FC9, an excessive decrease in the slip ratio can be suppressed by stopping opening of the oil passage FC9. At this time, since a threshold value (second reference slip ratio) of the slip ratio for stopping opening of the oil passage FC9 is lower than a threshold value (first reference slip ratio) of the slip ratio for opening the oil passage FC9 (that is, since the opening characteristics of the oil passage FC9 have hysteresis), the opening and the stopping of opening of the oil passage FC9 can be prevented from being frequently repeated.

In the control device 100, in the case of preventing the lockup clutch LC in the disengaged state from being shifted from the disengaged state to the engaged state, the control part CM opens the oil passage FC9 when the slip amount is equal to or less than the first reference slip amount, and stops opening of the oil passage FC9 when the slip amount is equal to or greater than the second reference slip amount that is greater than the first reference slip amount. Accordingly, even if the slip amount of the lockup clutch LC is excessively reduced due to, for example, disturbance, since the differential pressure can be reduced by opening the oil passage FC9, an increase in the engagement ratio of the lockup clutch LC can be suppressed. In addition, when the slip amount of the lockup clutch LC increases as a result of opening the oil passage FC9, an excessive increase in the slip amount can be suppressed by stopping opening of the oil passage FC9. At this time, since a threshold value (second reference slip amount) of the slip amount for stopping opening of the oil passage FC9 is higher than a threshold value (first reference slip amount) of the slip amount for opening the oil passage FC9 (that is, since the opening characteristics of the oil passage FC9 have hysteresis), the opening and the stopping of opening of the oil passage FC9 can be prevented from being frequently repeated.

In the control device 100, the control part CM calculates the slip ratio or the slip amount based on the input rotation speed and the output rotation speed of the lockup clutch LC, and calculates the filling ratio based on the input rotation speed and the oil temperature. For example, the control part CM may calculate the slip ratio based on a ratio of the input rotation speed to the output rotation speed of the lockup clutch LC. Alternatively, the control part CM may calculate the slip amount based on a difference between the input rotation speed and the output rotation speed of the lockup clutch LC. Accordingly, the above-mentioned actions and effects of the control device 100 can be suitably exhibited.

In the control device 100, the control part CM calculates the slip ratio or the slip amount based on the input rotation speed, the output rotation speed, and the heat generation amount of the lockup clutch LC. In the case where the heat generation amount is greater than the reference heat generation amount, the control part CM maintains the filling ratio so that the filling ratio is equal to or lower than the reference filling ratio. Accordingly, since the slip ratio or slip amount of the lockup clutch LC is calculated using the heat generation amount of the lockup clutch LC as well, relatively accurate calculation of the slip ratio or the slip amount is enabled. Since the filling ratio of the oil passage FC9 can be adjusted according to the heat generation amount of the lockup clutch LC, it is possible to maintain the differential pressure for operating the lockup clutch LC at a relatively suitable pressure.

[Modifications]

The above-mentioned embodiments can be carried out with various modifications or improvements based on the knowledge of those skilled in the art.

For example, in the above-mentioned embodiments, the control device 100 executes the oil passage early filling control in the case where the vehicle is traveling at the speed equal to or higher than the reference speed while accelerating. However, the control device 100 may also execute the oil passage early filling control in other cases. For example, the control device 100 may execute the oil passage early filling control in the case where the vehicle is traveling at a speed lower than the reference speed, or in the case where the vehicle is stopped. The control device 100 may also execute the oil passage early filling control in the case where the vehicle is traveling at a constant speed, or in the case where the vehicle is traveling while decelerating.

In particular, the oil passage early filling control in the case where the vehicle is traveling while decelerating may be executed under the following conditions. That is, when the lockup clutch LC is in the disengaged state while the vehicle is traveling at the speed equal to or higher than the reference speed while decelerating at a deceleration within a predetermined range, the control part CM may supply the hydraulic pressure to the lockup clutch LC so that the differential pressure is lower than the reference differential pressure. In addition, when the lockup clutch LC is shifted from the disengaged state to the engaged state while the vehicle is traveling at the speed equal to or higher than the reference speed while decelerating at the deceleration within the predetermined range, the control part CM may supply the hydraulic pressure to the lockup clutch LC so that the differential pressure increases as the filling ratio decreases.

According to this, in the case where the vehicle is traveling at the speed equal to or higher than the reference speed while decelerating at the deceleration within the predetermined range, the differential pressure for operating the lockup clutch LC increases. In such a case, since the vehicle is in the deceleration state, even if the slip ratio of the lockup clutch LC is excessively increased or the slip amount of the lockup clutch LC is excessively reduced due to, for example, disturbance, the occupant is not easily aware of vibration or the like of the vehicle caused by an increase in the engagement ratio of the lockup clutch LC. The "deceleration within the predetermined range" may be set in advance or may be individually set (changed). A specific numerical value of the deceleration within the predetermined range may be arbitrarily set. As described above, when the lockup clutch LC is in the disengaged state in the case where a predetermined speed condition is satisfied, the hydraulic pressure is supplied to the lockup clutch LC so that the differential pressure is lower than the reference differential pressure. At this time, the hydraulic pressure supplied in the case where the vehicle is traveling at the speed equal to or higher than the reference speed while decelerating at the deceleration within the predetermined range may be set lower than the hydraulic pressure supplied in the case where the vehicle is traveling at the speed equal to or higher than the reference speed while accelerating. According to this, since durability associated with engine stop due to disturbance is generally lower during deceleration than during acceleration, by maintaining the hydraulic pressure for deceleration, engine stop (engine stall) due to disturbance is less likely to occur.

In the above-mentioned embodiments, the engaged state refers to, for example, the state in which the lockup clutch LC has a torque capacity, and the disengaged state refers to, for example, the state in which the lockup clutch LC has no torque capacity. However, the engaged state may refer to, for example, a state in which the lockup clutch LC has a torque capacity equal to or greater than a predetermined capacity, and the disengaged state may refer to, for example, a state in which the lockup clutch LC has a torque capacity less than the predetermined capacity.

In the above-mentioned embodiments, the control part CM of the control device 100 calculates the slip ratio or the slip amount based on the input rotation speed of the lockup clutch LC, the output rotation speed of the lockup clutch LC, and the heat generation amount of the lockup clutch LC. In the case where the heat generation amount is greater than the reference heat generation amount, the control part CM maintains the filling ratio so that the filling ratio is equal to or lower than the reference filling ratio. However, the control part CM may calculate the slip ratio or the slip amount without using the heat generation amount of the lockup clutch LC. That is, the control part CM may calculate the slip ratio or the slip amount based on the input rotation speed and the output rotation speed of the lockup clutch LC. Alternatively, the control part CM may acquire the slip ratio or the slip amount based on the input torque to the transmission T/M and the rotation speed of the mainshaft MS. Specifically, the control part CM may acquire the slip ratio or the slip amount from a slip ratio map (a map of the slip ratio corresponding to the input torque to the transmission T/M and the rotation speed of the mainshaft MS) acquired in advance based on the characteristics of the torque converter 12 obtained from test data.

In the above-mentioned embodiments, the control part CM is the ECU 80 that controls the operation of the hydraulic circuit FC. However, the control part CM is not limited to the ECU 80 if having a configuration for controlling the operation of the hydraulic circuit FC. For example, the control part CM may include a physical configuration such as a hydraulic circuit in addition to the ECU 80 as a controller (control unit), or may be composed only of a physical configuration such as a hydraulic circuit.

The oil passage early filling control according to the above-mentioned embodiments may be executed under, for example, the following conditions. That is, at the time of LC OFF, a command pressure may be output in accordance with each of the following conditions so as to maintain a filling state of the oil passage FC9 of the lockup clutch LC (without opening the lockup clutch shift valve FC7) and maintain the slip ratio or slip amount of the lockup clutch LC within a predetermined range.

For example, the oil passage early filling control may be used in combination with control in which the LC command pressure of the lockup clutch LC is set based on the rotation speed of the mainshaft MS, the oil temperature, and the PH pressure when the lockup clutch LC shifts from the engaged state (LC ON) to the disengaged state (LC OFF).

In addition, in the oil passage early filling control, filling of the oil passage FC9 may not be performed during a failure of an anti-lock braking system (ABS), during a travel at an ABS non-operating vehicle speed, or at the time of LC OFF during deceleration at a deceleration equal to or higher than a preset reference deceleration. Specifically, under the above conditions, the lockup clutch shift valve FC7 may be opened.

In addition, in the oil passage early filling control, in a fail-safe state, a state in which operating conditions of the lockup clutch LC with respect to oil temperature and water temperature fail to be met, or at the time of LC OFF when the shift lever 54 selects a range other than a forward stage, filling of the oil passage FC9 may not be performed. Specifically, under the above conditions, the lockup clutch shift valve FC7 may be opened.

In addition, in the oil passage early filling control, with respect to the opening and the stopping of opening (that is, opening and filling) of the oil passage FC9 at the time of LC OFF, hysteresis may be set in the conditions of vehicle speed, oil temperature, or water temperature.

What is claimed is:

1. A control device controlling a lockup clutch interposed between a drive source and an automatic transmission mechanism of a vehicle, wherein the control device comprises:
    a control part, supplying hydraulic pressure to the lockup clutch and controlling differential pressure of the lockup clutch, wherein
    the control part is configured to:
        supply the hydraulic pressure to the lockup clutch so that the differential pressure is lower than a reference differential pressure in a disengaged state of the lockup clutch; and
        in a case of shifting the lockup clutch from the disengaged state to an engaged state, supply the hydraulic pressure to the lockup clutch so that the differential pressure increases as a filling ratio of an oil passage of the lockup clutch decreases, wherein
    the reference differential pressure is a lower limit of the differential pressure that increases a slip ratio of the lockup clutch, or a lower limit of the differential pressure that reduces a slip amount of the lockup clutch.

2. The control device according to claim 1, wherein the control part is configured to:

when the lockup clutch is in the disengaged state while the vehicle is traveling at a speed equal to or higher than a reference speed while accelerating, supply the hydraulic pressure to the lockup clutch so that the differential pressure is lower than the reference differential pressure; and when the lockup clutch is shifted from the disengaged state to the engaged state while the vehicle is traveling at the speed equal to or higher than the reference speed while accelerating, supply the hydraulic pressure to the lockup clutch so that the differential pressure increases as the filling ratio decreases.

3. The control device according to claim 1, wherein the control part is configured to:

when the lockup clutch is in the disengaged state while the vehicle is traveling at a speed equal to or higher than a reference speed while decelerating at a deceleration within a predetermined range, supply the hydraulic pressure to the lockup clutch so that the differential pressure is lower than the reference differential pressure; and when the lockup clutch is shifted from the disengaged state to the engaged state while the vehicle is traveling at the speed equal to or higher than the reference speed while decelerating at the deceleration within the predetermined range, supply the hydraulic pressure to the lockup clutch so that the differential pressure increases as the filling ratio decreases.

4. The control device according to claim 1, wherein, in a case of preventing the lockup clutch in the disengaged state from being shifted from the disengaged state to the engaged state, the control part opens the oil passage when the slip ratio is equal to or higher than a first reference slip ratio, and stops opening of the oil passage when the slip ratio is equal to or lower than a second reference slip ratio that is lower than the first reference slip ratio.

5. The control device according to claim 1, wherein, in a case of preventing the lockup clutch in the disengaged state from being shifted from the disengaged state to the engaged state, the control part opens the oil passage when the slip amount is equal to or less than a first reference slip amount, and stops opening of the oil passage when the slip amount is equal to or greater than a second reference slip amount that is greater than the first reference slip amount.

6. The control device according to claim 1, wherein the control part is configured to:

calculate the slip ratio or the slip amount based on an input rotation speed and an output rotation speed of the lockup clutch; and calculate the filling ratio based on the input rotation speed and an oil temperature.

7. The control device according to claim 6, wherein the control part is configured to:

calculate the slip ratio or the slip amount based on the input rotation speed, the output rotation speed, and a heat generation amount of the lockup clutch; and in response to the heat generation amount being greater than a reference heat generation amount, maintain the filling ratio so that the filling ratio is equal to or lower than a reference filling ratio.

8. The control device according to claim 2, wherein the control part is configured to:

when the lockup clutch is in the disengaged state while the vehicle is traveling at the speed equal to or higher than the reference speed while decelerating at a deceleration within a predetermined range, supply the hydraulic pressure to the lockup clutch so that the differential pressure is lower than the reference differential pressure; and when the lockup clutch is shifted from the disengaged state to the engaged state while the vehicle is traveling at the speed equal to or higher than the reference speed while decelerating at the deceleration within the predetermined range, supply the hydraulic pressure to the lockup clutch so that the differential pressure increases as the filling ratio decreases.

9. The control device according to claim 8, wherein, in a case of preventing the lockup clutch in the disengaged state from being shifted from the disengaged state to the engaged state, the control part opens the oil passage when the slip ratio is equal to or higher than a first reference slip ratio, and stops opening of the oil passage when the slip ratio is equal to or lower than a second reference slip ratio that is lower than the first reference slip ratio.

10. The control device according to claim 8, wherein, in a case of preventing the lockup clutch in the disengaged state from being shifted from the disengaged state to the engaged state, the control part opens the oil passage when the slip amount is equal to or less than a first reference slip amount, and stops opening of the oil passage when the slip amount is equal to or greater than a second reference slip amount that is greater than the first reference slip amount.

11. The control device according to claim 8, wherein the control part is configured to:

calculate the slip ratio or the slip amount based on an input rotation speed and an output rotation speed of the lockup clutch; and calculate the filling ratio based on the input rotation speed and an oil temperature.

* * * * *